United States Patent Office 3,465,027
Patented Sept. 2, 1969

3,465,027
PROCESS FOR MANUFACTURE OF HIGH
PURITY α-CYANOACRYLATES
Gary F. Hawkins, Kingsport, Tenn., assignor to Eastman
Kodak Company, Rochester, N.Y., a corporation of
New Jersey
No Drawing. Filed Dec. 9, 1965, Ser. No. 512,797
Int. Cl. C07c 121/40, 121/02, 121/30
U.S. Cl. 260—464                                    2 Claims

ABSTRACT OF THE DISCLOSURE

Process for preparing esters of α-cyanoacrylic acid of a highly purified form by a combination of process steps and the control of the reaction conditions in such a manner that substantially all of the basic catalyst originally employed to catalyze the reaction between formaldehyde and cyanoacetate to produce the intermediate polymeric product is removed and no more than traces of acidic material will remain in the intermediate product. The esters of α-cyanoacrylic acid prepared according to the process are useful in adhesive compositions.

---

This invention relates to the preparation of esters of α-cyanoacrylic acid and more particularly to the preparation of monomeric α-cyanoacrylates of high purity and special usefulness in adhesive compositions.

The monomeric form of an α-cyanoacrylate has in the past usually been prepared by depolymerization of a polymer thereof which is formed by reacting a cyanoacetate with formaldehyde or a polymer of formaldehyde in the presence of a basic condensation catalyst. Heretofore, the reaction has been carried out between substantially equimolar proportions of formaldehyde and the cyanoacetic ester, thereby producing an intermediate polymer which was difficult to pyrolyze, usually employing a heat transfer medium. A method of this kind is disclosed in Joyner and Hawkins U.S. Patent 2,721,858.

It is known that the monomeric α-cyanoacrylates are readily polymerizable without the use of either heat or a catalyst and as a consequence it has been difficult to store the monomeric material without premature polymerization. It is also known that trialkyl phosphate, glutarimide, cyanoacetic esters and traces of other unidentified compounds are often formed in the process heretofore used in preparing α-cyanoacrylates and that some of these impurities contribute to the instability of the monomers.

Recently an improved method has been developed for producing monomeric α-cyanoacrylates which insures the formation of fluid anhydrous intermediate polymeric α-cyanoacrylates without the necessity of employing solvents or liquid transfer agents in the pyrolysis. More specifically, in this improved method cyanoacetates are reacted with formaldehyde in the molar ratio of more than one but less than two mols of cyanoacetate per mol of formaldehyde in the presence of a basic condensation catalyst in a low boiling nonaqueous solvent such as benzene, thereby to produce a low molecular weight intermediate polymer. The nonaqueous solvent is employed to provide a means of azeotropically removing the water formed in the reaction. After the reaction has been completed the solvent is removed by distillation. By this procedure a substantially anhydrous, fluid, crude polymer is obtained as a residue. The polymer can then be readily depolymerized by heating in the presence of a polymerization inhibitor without the necessity of further drying. The monomeric vapor evolved from the polymer is condensed and recovered as the desired monomeric α-cyanoacrylate product. Since this monomer has a low water content it has good stability against polymerization.

The improved process referred to in the preceding paragraph is a marked improvement over prior processes in yielding a cyanoacrylate product uncontaminated with other materials such as certain by-products of the reaction. Furthermore, a polymeric intermediate reaction product is obtained having an average composition of relatively low molecular weight and this intermediate product is susceptible of depolymerization under conditions such that the depolymerization product consists essentially of α-cyanoacrylate and substantially undecomposed α,α'-dicyanoglutarate. The process referred to is desired and claimed in the copending application of Gary F. Hawkins and Hartsell F. McCurry, Ser. No. 74,748, filed Dec. 9, 1960, now U.S. Patent No. 3,254,111, and entitled "Process for the Manufacture of Esters of α-Cyanoacrylic Acid." As will be set forth in detail hereinafter the present invention is an improvement in this process whereby cyanoacrylate adhesive products of extremely high purity may be obtained.

The improved process described above involves the use as catalytic material of basic substances such as alkali and alkaline earth metal hydroxides such as sodium hydroxide, calcium hydroxide and various amines such as piperidine. In practicing this process these basic materials are neutralized, following completion of the reaction in which the intermediate polymeric product is formed, by treatment of the reaction mixture with an excess of certain acidic materials such as phosphoric acid, polyphosphoric acid, $P_2O_5$ and the like. However, this introduces the possibility of contaimination of the desired α-cyanoacrylate product by formation, during the pyrolysis step, of undesirable volatile by-products and also by occlusion in the cyanoacrylate product of the naturalization products resulting from the action of the acidic material on the basic catalyst. Since acids and acid anhydrides such as phosphoric acid, polyphosphoric acid and $P_2O_5$ can also react with organic cyanides to produce secondary and tertiary amides and since these acidic compounds can also react with the products formed in the pyrolysis of the intermediate polymeric material at the usual pyrolysis temperature (i.e., above about 150° C.) a still further source of contamination of the desired product is introduced. Furthermore, I have found that if the pyrolysis is carried out in the presence of a base the reaction product is decomposed to form the starting material, namely, cyanoacetate, and a heavy undesirable polymer. Normally the amount of phosphoric acid which is present in the product at this stage, i.e., the small amount that is soluble in the supernatant liquid or filtrate from the physical separation stage, will be sufficient to insure satisfactory results in the pyrolysis stage. In fact, the stabilization without accompanying undesired side reactions, afforded by this small amount of phosphoric acid that is soluble in the intermediate product constitutes one of the valuable advantages of my invention as will be more fully explained hereinafter and illustrated by the included examples. While the process described will produce a product of excellent purity compared to cyanoacrylate products available prior to the advent of that process, it is desirable, under certain conditions, as for example in producing an α-cyanoacrylate composition for use as a surgical adhesive, to produce a monomeric product of even greater purity.

It is accordingly the principal object of the present invention to provide alkyl, substituted alkyl, alkenyl, cyclohexyl and aryl α-cyanoacrylates of an extremely high degree of purity.

A further object is to provide an improved and highly efficient process whereby alkyl, substituted alkyl, alkenyl, cyclohexyl and aryl α-cyanoacrylate monomers may be produced in such manner as to contain substantially no impurities such as might arise from the reaction of the catalyst with either the intermediate polymer product produced in the process or with its pyrolysis product.

A still further object is to provide a process whereby alkyl, substituted alkyl, alkenyl, cyclohexyl and aryl α-cyanoacrylate monomers of high molecular weight, and especially those containing reactive groups, may be produced in substantially pure condition.

Other objects will appear hereinafter.

These objects are accomplished by the following invention which, in its broader aspects, is based upon the basic concept that esters of α-cyanoacrylic acid of both high and low molecular weight and represented by the general formula;

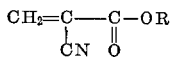

wherein R is a member selected from the class consisting of an alkyl group of 1 to 16 carbon atoms, a substituted alkyl group such as alkoxyalkyl, acyloxyalkyl, haloalkyl, etc., a cyclohexyl group, a phenyl group and an alkenyl group of 2 to 16 carbon atoms, may be produced in a highly purified form by a combination of process steps and the control of the reaction conditions in such manner that all, or substantially all, of the basic catalyst originally employed to catalyze the reaction between formaldehyde (or paraformaldehyde) and the cyanoacetate to produce the intermediate polymeric product is removed and no more than traces of acidic material will remain in the intermediate product. Typical examples of compounds which can be thus produced in this state of high purity are ethyl, n-propyl, iso-propyl, n-butyl, iso-butyl, n-amyl, isoamyl, n-hexyl, n-decyl, cyclopentyl, cyclohexyl, allyl, 2-butenyl, 3-acetoxypropyl, 2-methoxyethyl 3-methoxypropyl, 3-chloropropyl, benzyl and phenyl α-cyanoacrylates.

The removal of the basic catalyst in accordance with the present invention will be more readily understood by reference to the following equation which illustrates a preferred method of carrying out the steps of the overall process.

(1)

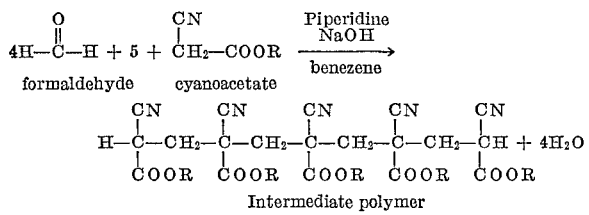

Intermediate polymer (2)

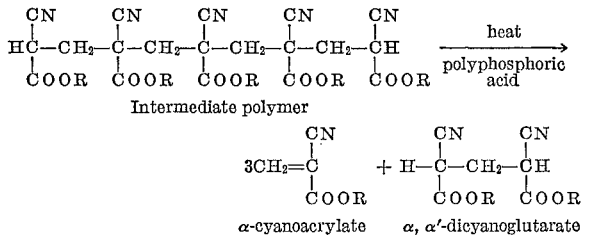

α-cyanoacrylate  α,α'-dicyanoglutarate

Wherein R is an alkyl group of 1 to 16 carbon atoms, a substituted alkyl group such as alkoxyalkyl, haloalkyl, and acyloxyalkyl, an alkenyl group, a cyclohexyl or aryl group.

In practicing the invention more than 1 mol and less than 2 mols of a cyanoacetate ester, such as methyl cyanoacetate, is reacted per mol of formaldehyde to prepare the intermediate polymer. Preferably 4 mols of formaldehyde are reacted with 5 mols of cyanoacetate in the presence of piperidine and sodium hydroxide as catalyst to give an intermediate polymer product. As shown in the above equations, the intermediate product is thereafter depolymerized to form a mixture of 3 mols of α-cyanoacrylate and 1 mol of α,α'-dicyanoglutarate. Following depolymerization, the α-cyanoacrylate product is separated from the mixture by vacuum distillation.

As described in the above mentioned application Ser. No. 74,748, the use of 1 mol but less than 2 mols of cyanoacetate per mol of formaldehyde makes possible the formation of a fluid solution of the intermediate polymeric product in a nonaqueous solvent such as benzene from which the basic catalyst can be removed in accordance with the instant invention as will be more fully described hereinafter.

The specific mol ratio of cyanoacetate to the formaldehyde reactant, in order to obtain the desired fluid solution of the polymeric intermediate in the solvent, will depend upon the physical and chemical characteristics of the particular cyanoacetic ester selected, such as molecular weight and the presence therein, or absence therefrom, of substituent groups such as alkoxy, halogen, acyloxy, etc. Although the scope of the instant invention extends to the use of molar ratios higher than 1.5:1 (but less than 2:1). in general, to obtain the desired polymeric intermediate product with minimum yield of undesired products the mol ratio of the cyanoacetic ester to formaldehyde should be between 1:1 to 1.5:1 and preferably between 1:1 and 1.25:1.

The reaction between the cyanoacetic ester and formaldehyde is readily effected by heating the initial reaction mixture to a temperature within the range of 25–125° C. in the presence of an inorganic or organic basic condensation catalyst or a combination of such catalysts. Suitable inorganic catalysts include the inorganic bases such as sodium or potassium hydroxide, ammonia, or ammonium hydroxide. Typical examples of suitable organic bases are quinoline, piperidine, isoquinoline, dialkyl amines such as diethyl amine, alkali metal alkoxides such as sodium or potassium methoxide or ethoxide. The particular amount of catalyst employed is not critical, but ordinarily a very small amount of the basic material, such as about 0.01 to 1.0 percent by weight, based on the weight of the reactants, is adequate. Larger amounts of catalyst can be used in some instances but are not usually advantageous.

Although the initial reaction between the cyanoacetate and formaldehyde is preferably carried out in the presence of a nonaqueous organic solvent which is capable of forming an azeotrope with water, if desired, the reaction, may be carried out without a solvent and the solvent added later. In such a case the bulk of the water may already have been removed before the solvent is added by simultaneous heating and application of vacuum to the reaction vessel. The subsequent addition of solvent provides a means of azeotropically removing any water which may still be present in the mixture. In addition to removing water the solvent serves the further purpose of solubilizing the intermediate polymer formed in the initial polymer-forming reaction of Equation 1 above.

It is, of course, necessary that the azeotropic solvent distill at a temperature below the depolymerization temperature of the intermediate polymeric product. A number of volatile organic solvents are suitable for use in this step because depolymerization is usually effected by heating the polymeric intermediate product at a temperature of the order of 100 to 185° C. under a vacuum of the order of 1–3 mm. Hg. Although benzene is greatly preferred as the azeotrope-forming solvent, because it makes feasible the use of a suitable temperature of distillation, other suitable solvents such as toluene, xylene and heptane may be employed for this purpose since they also distill at temperatures below the depolymerization temperature of the intermediate polymer.

In producing a high purity cyanoacrylate product in accordance with the instant invention, any suitable type of apparatus may be employed depending upon whether the process is carried out in the laboratory on a relatively small scale or on a larger scale, as in a commercial installation. For purposes of describing the invention and illustrating the manipulative procedures involved reference will now be made to a typical laboratory installation. In this case the apparatus can conveniently consist of a 3-necked flask provided with an appropriate stirrer inserted thorugh one of the necks of the flask. A Dean-Stark tube surmounted by a reflux condenser is inserted into another neck of the flask while a dropping funnel and a thermometer are inserted through the third neck of the flask. Heat may be supplied to the flask by any appropriate means such as a heating mantel.

An appropriate charge of the selected cyanoacetate in liquid form is placed in the flask. Approximately 0.5%, based on the weight of the cyanoacetate charge, of piperidine and approximately the same amount of sodium hydroxide, as an aqueous solution, are added to the material in the flask to function as a condensation catalyst. The flask is then closed and a slurry of paraformaldehyde in a separate portion of the cyanoacetate reactant is prepared and slowly added dropwise to the charge in the flask by means of the dropping funnel.

Referring to Equation 1 it will be seen that water is a product of the reaction. In order to obtain a satisfactory ultimate cyanoacrylate product this water must be removed by appropriate means as otherwise the water would act as a polymerization catalyst and thus preclude obtaining the desired ultimate product in pure monomeric form. One expedient for removing the water is, as indicated above, first to apply heat and vacuum to the system, thereby to remove as much water by this means as possible, preferably followed by the addition of benzene in an amount approximately equal to the weight of the cyanoacetate reactant. Since benzene forms an azeotrope with water this provides a means of azeotropically removing the remaining water from the reaction zone. Alternatively, the benzene may be added in an amount approximately equal in weight to the cyanoacetate reactant at the beginning of the initial polymerization reaction (Equation 1) and the water removed azeotropically during the course of the reaction.

As previously indicated, the reaction for producing the intermediate polymeric product may be carried out within the range of 25–125° C. If a solvent such as benzene is initially employed in carrying out the reaction heating will be so controlled as to provide gentle reflux.

Following the initial reaction the intermediate polymer product is in solution in the solvent. The solution is then filtered or decanted to thus physically remove as much of the insoluble catalyst as possible by this means at this point in the process. However, traces of catalyst may still remain as a contaminant in the intermediate polymer product and since it is the principal object of the invention to obtain as pure a cyanoacrylate product as as possible, such traces of contaminant must be removed. This is accomplished by adding to the solution of the intermediate polymer product an excess of an acidic material such as phosphoric acid which reacts with any traces of basic catalytic material which may still be present to form a precipitate or sludge which falls to the bottom of the reaction vessel and from which the condensation product is physically separated, as by decantation. The term phosphoric acid as used herein and in the appended claims is used in a broad sense to include, not only phosphoric acid itself, but also the various dehydrated forms thereof such as $P_2O_5$, polyphosphoric acid, pyrophosphoric acid, metaphosphoric acid and the like, all of which forms of phosphoric acid are only slightly soluble in the intermediate reaction mixture at the temperature employed. Since phosphoric acid is only slightly soluble, the greater part of it can be removed from the intermediate product by physical separation methods such as filtration or decantation. The trace thereof that is soluble imparts slight acidity to the filtered or decanted liquid and this has been found to be desirable in the subsequent depolymerization stage.

It should be noted that removal of the basic catalytic material from the reaction mixture is, in accordance with the invention, for the purpose of preventing any undesirable course of the reaction which might result in the formation of undesirable by-products. On the other hand, the employment of too large an excess of acid should also be avoided as this would result in the formation of still other undesirable volatile by-products which would contaminate the ultimate α-cyanoacrylate product.

Following neutralization of the catalyst as above described the solution of the intermediate polymer product is decanted from the flask and transferred to another similar flask or other suitable vessel provided with a thermometer, stirrer and condenser fitted with a suitable receiver or third flask with means for applying vacuum. The second flask is heated to a sufficient temperature to distill off the solvent. After the solvent has been completely removed, the intermediate polymeric product, which at this point contains traces of acidic material, is pyrolyzed at a suitable temperature, for example, a temperature within the range of 150–200° C. and preferably within the range of 165–185° C.

Depolymerization is preferably and in accordance with the invention effected in the above mentioned second flask by heating the intermediate polymer, at a low pressure of the order of 1 mm. of Hg or less to a temperature within the range of 150 to 200° C. and in the presence of the above mentioned traces of acidic material which functions as a polymerization inhibitor.

If difficulties in the pyrolysis stage are encountered, such as polymerization in the condenser or other parts of the system, a further amount of acidic material can be added to the intermediate which is being depolymerized. As indicated above, the acidic polymerization inhibitor will, however, generally be the slight excess of acid required to neutralize the basic catalytic material. During pyrolysis the intermediate polymer product is depolymerized or broken down to form a mixture of the products indicated at the right hand side of Equation 2, i.e., a crude product composed of 3 mols of α-cyanoacrylate and 1 mol of α,α'-dicyanoglutarate. During pyrolysis these products are distilled under vacuum and collected in the above mentioned receiver to which has been added a small amount, such as 0.1 percent of a free radical polymerization inhibitor such as hydroquinone and about 5 percent, based on the weight of the original reactants, of an ionic polymerization inhibitor such as polyphosphoric acid.

The α-cyanoacrylate product is then distilled under vacuum from the mixture of α-cyanoacrylate and α,α'-dicyanoglutarate into the receiver containing a free radical polymerization inhibitor such as hydroquinone leaving α,α'-dicyanoglutarate behind. If desired, this may be reused in the process, substituting 1 mol of α,α'-dicyanoglutarate for 2 mols of cyanoacetate and 1 mol of formaldehyde in the reaction illustrated by Equation 1 above.

In the preferred practice, a gaseous ionic polymerization inhibitor such as sulfur dioxide is introduced into the system at both the pyrolysis stage and the redistillation stage.

In general, as to the use of inhibitors, it is preferred to employ such agents for inhibiting both ionic and free radical polymerization. However, the more important of the two types of inhibitors are acidic substances that inhibit ionic polymerization. Suitable nonvolatile ionic polymerization inhibitors include phosphoric acid, metaphosphoric acid, pyrophosphoric acid, polyphosphoric acid and phosphorus pentoxide. A particularly valuable group of ionic polymerization inhibitors are the acidic gaseous inhibitors such as sulfur dioxide, nitric oxide, hydrogen fluoride, and the like. Suitable free radical inhibitors include hydroquinone, tertiary butyl catechol, butylated hydroxyanisole and the like.

In the following examples and description there are set forth several of the preferred embodiments of the invention but they are included primarily for purposes of illustration and not as a limitation of the invention.

EXAMPLE 1

To 396 parts (4.0 mols) of methyl cyanoacetate, 350 parts benzene, 1 part piperidine and 1 part of 50% sodium hydroxide solution contained in a 1 liter, stirred flask fitted with a condenser and Dean-Stark tube was added 100 parts (3.33 mols; 1:1.2 ratio) of paraformaldehyde in 4 portions while refluxing to remove the water formed. After substantially all the water of reaction was removed the hot solution was decanted leaving behind the solids derived from the catalysts employed. Twenty parts of polyphosphoric acid were added with good stirring. After about 10 minutes of stirring enough phosphorus pentoxide was added to cause the polyphosphoric acid and phosphates to adhere to the sides of the container. The solution was decanted, the benzene was stripped out and the residue pyrolyzed by heating at 170° C. to 185° C. under good vacuum. The distillate was collected in a cooled flask containing 5 parts of phosphorus pentoxide and 1 part of hydroquinone. Very little residue remained in the pyrolysis vessel.

The crude product was distilled in a stream of sulfur dioxide, under vacuum into a cooled receiver containing 1 part of hydroquinone. The product weighed 223.3 g. and was of high quality. The higher boiling residue, mostly dimethyl $\alpha,\alpha'$-dicyanoglutarate, weighed 134 g.

EXAMPLE 2

To 2500 grams (17.35 mols) of isobutyl cyanoacetate, 1500 ml. of benzene, 3 g. of piperidine and 3 g. of 50% sodium hydroxide solution was added 450 g. of paraformaldehyde (15 mols; a ratio of 1:1.165) in portions while azeotroping out the water formed. After standing overnight the polymer was too hard to manipulate so 50 g. more isobutyl cyanoacetate was added making the ratio 1:1.177. After obtaining a solution by heat it was decanted from solids which had settled out. About 25 g. of $P_2O_5$ and after several minutes about 50 grams of polyphosphoric acid were added with stirring. Zinc dust was added as a filtration aid and the solution was filtered. The filtrate was stripped of benzene and pyrolyzed to give 2186 g. of crude product, which, upon redistillation produced 1200 grams of purified product.

EXAMPLE 3

To 102.5 grams (0.64 mol) 3-chloropropyl cyanoacetate, 2 g. of 50% NaOH and 1 g. piperidine was added slowly 17.5 g. (0.593 mol; 1:1.1 ratio) paraformaldehyde. Two hundred ml. of xylene was added and stripped under vacuum to remove as much water as possible. Two hundred ml. of toluene was then added and azeotroped under atmospheric pressure to complete the removal of water. Two hundred ml. more toluene was added along with 5 g. of polyphosphoric acid. After settling the supernatant liquid was decanted. One gram of hydroquinone and a trace of polyphosphoric acid were added to the solution which was stripped and pyrolyzed. The crude was redistilled to give 44 grams of 3-chloropropyl $\alpha$-cyanoacrylate of good stability and adhesive properties.

EXAMPLE 4

To 99 g. (0.5 mol) 4,7-dioxaoctyl cyanoacetate and about 0.5 gram $NaOCH_3$ was added slowly 14.5 g. of paraformaldehyde (0.485 mol; 1:1.03 ratio). The reaction was slow but after completion it was stripped under vacuum at up to 90° C. About 200 ml. of toluene was added and partially distilled out to remove the remaining water by azeotroping. The residue was filtered to remove solids. Ten grams of polyphosphoric acid and about 5 grams of $P_2O_5$ were added separately with stirring and after 10 minutes allowed to settle out. The supernatant liquid was decanted and stripped. The intermediate polymeric product was pyrolyzed and the crude product was distilled to give 18.5 grams of 4,7-dioxaoctyl $\alpha$-cyanoacrylate having good adhesive properties.

EXAMPLE 5

To 1344 g. of high boilers (diisobutyl $\alpha,\alpha'$-dicyanoglutarate) from previous runs of isobutyl cyanoacrylate, 500 ml. of benzene, 2 grams of piperidine and 4 grams of 50% NaOH solution was added, in 3 portions, 97 grams of paraformaldehyde, between additions the water formed being azeotroped out of the reactor. When all of the water had been removed the reaction mixture was too viscous to manipulate satisfactorily so 500 ml. more benzene was added. The solution was filtered hot and to the filtrate was added 25 grams of $P_2O_5$. After 15 minutes of refluxing 25 g. of polyphosphoric acid was added to coagulate the phosphates. After settling for about 10 minutes the organic layer was decanted and pyrolyzed. The crude intermediate product was redistilled to give 620 grams of isobutyl cyanoacrylate suitable for use as an adhesive.

EXAMPLE 6

To 247 parts of 3-acetoxypropyl cyanoacetate, 300 parts of benzene, 1 part piperidine and 1 part 50% sodium hydroxide solution, at reflux, was slowly added a slurry of 133 parts of 3-acetoxypropyl cyanoacetate and 60 parts of paraformaldehyde. After all of the water formed in the reaction had been azeotropically removed the reaction mixture was filtered to remove precipitated solids. About 10 parts each of phosphorus pentoxide and polyphosphoric acid were added to the mixture which was then refluxed for 20 minutes. After being allowed to settle, the supernatant liquid was decanted. The benzene was removed by distillation and the residue was pyrolyzed at 150–180° C. under a vacuum of about 0.5 mm. of mercury. The crude product was redistilled, producing 101 parts of 3-acetoxypropyl $\alpha$-acrylate which, after adding about .1 part of hydroquinone and a trace of $SO_2$, was stable and active as an adhesive.

EXAMPLE 7

To a mixture of 423 g. (3.0 mols) of n-butyl cyanoacetate and 3 g. of sodium methylate was slowly added, at 25° to 50° C., 78 g. (2.6 mols) of paraformaldehyde (1:1.15 ratio). After completion of the reaction the mixture was stripped under vacuum. Four hundred ml. of benzene was added and refluxed to remove the remainder of the water by azeotrope. The hot solution was filtered to remove solids which according to analysis consisted of sodium cyanoacetate. About 20 g. of polyphosphoric acid was added to the filtrate and after stirring for 10 minutes was allowed to settle to the bottom of the flask. The solution was decanted and after adding 1 to 2 g. of $P_2O_5$ it was pyrolyzed and the crude product redistilled to give 158.7 g. of n-butyl $\alpha$-cyanoacrylate.

It appears that the $\alpha$-cyanoacrylate adhesive compositions produced in accordance with Examples 3, 4, and 6 are new compositions of matter.

The monomeric $\alpha$-cyanoacrylic products prepared in accordance with this invention have been found to possess an unusual and unexpectedly high degree of purity not heretofore consistently attainable in the manufacture of such material by prior procedures. The instant process for producing these monomeric materials is in itself unexpectedly novel in that no means has ever heretofore been provided for attaining consistently high purity products of this type. These improved and high purity compositions are excellent adhesive compositions for bonding almost any type of material to itself or to a dissimilar material. These adhesive compositions are readily employed by merely spreading them in a thin film on the surfaces to be bonded. Polymerization occurs within a few seconds

I claim:

1. In the process for preparing a monomeric α-cyanoacrylate of the formula:

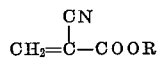

which comprises reacting a cyanoacetate of the formula, NCCH$_2$COOR, with formaldehyde in a molar ratio of more than one but less than two mols of cyanoacetate per mol of formaldehyde in the presence of a basic condensation catalyst, azeotropically distilling off water from a mixture of the reaction product with a nonaqueous organic solvent which forms an azeotrope with water to obtain a substantially anhydrous intermediate polymeric reaction product, subjecting said intermediate product in the presence of a polymerization inhibitor to pyrolysis to thereby depolymerize said intermediate product to a mixture of said α-cyanoacrylate and α,α'-dicyanoglutarate of the formula:

and separating said α-cyanoacrylate from said glutarate by distillation, wherein in the above formulae R is a member selected from the class consisting of an alkyl group of 1 to 16 carbon atoms, an alkoxyalkyl group, an acyloxyalkyl group, a haloalkyl group, a cyclohexyl group, a phenyl group and an alkenyl group of 2 to 16 carbon atoms, the improvement which comprises neutralizing the basic condensation catalyst with phosphoric acid and physically separating the products of neutralization from the reaction mixture prior to said pyrolysis of the intermediate polymeric product and subsequently subjecting the separated reaction mixture to pyrolysis to obtain said monomeric α-cyanoacrylate as product.

2. In the process of preparing a monomeric α-cyanoacrylate of the formula:

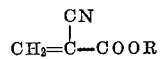

which comprises reacting a cyanoacetate of the formula, NCCH$_2$COOR, with formaldehyde in a molar ratio of more than one but less than two mols of cyanoacetate per mol of formaldehyde in the presence of a basic condensation catalyst, azeotropically distilling off water from a mixture of the reaction product with a nonaqueous organic solvent which forms an azeotrope with water to obtain a substantially anhydrous intermediate polymeric reaction product, subjecting said intermediate product in the presence of a polymerization inhibitor to pyrolysis to thereby depolymerize said intermediate product to a mixture of said α-cyanoacrylate and α,α'-dicyanoglutarate of the formula:

and separating said α-cyanoacrylate from said glutarate by distillation, wherein in the above formulae R is a member selected from the class consisting of an alkyl group of 1 to 16 carbon atoms, an alkoxyalkyl group, an acyloxyalkyl group, a haloalkyl group, a cyclohexyl group, a phenyl group and an alkenyl group of 2 to 16 carbon atoms, the improvement which comprises physically separating substantially all of the basic condensation catalyst from the condensation product, neutralizing all traces of remaining basic condensation catalyst by treating said product with an excess of phosphoric acid, physically separating the condensation product in liquid form from the sludge resulting from neutralization, including insoluble phosphoric acid, and subjecting the separated liquid to pyrolysis to obtain said monomeric α-cyanoacrylate as product.

References Cited

UNITED STATES PATENTS 2,721,858  10/1955  Joyner et al. _ _ _ 260—465.4 XR
3,254,111   5/1966  Hawkins et al. _ _ _ _ 260—465.4

JOSEPH P. BRUST, Primary Examiner

U.S. Cl. X.R.

260—465.4, 465